(12) United States Patent
Simonelli et al.

(10) Patent No.: US 7,031,130 B2
(45) Date of Patent: Apr. 18, 2006

(54) PROTECTION DEVICE FOR PROTECTING A VOLTAGE SOURCE AND A LOAD SUPPLIED THEREBY

(75) Inventors: Giulio Simonelli, Oegstgeest (NL); Philippe Alfred Perol, Den Haag (NL)

(73) Assignee: Agence Spatiale Europeenne, (FR)

( * ) Notice: Subject to any disclaimer, the term of this patent is extended or adjusted under 35 U.S.C. 154(b) by 332 days.

(21) Appl. No.: 10/264,174

(22) Filed: Oct. 2, 2002

(65) Prior Publication Data
US 2003/0076638 A1 Apr. 24, 2003

(30) Foreign Application Priority Data
Oct. 3, 2001 (FR) .................................. 01 12724

(51) Int. Cl.
*H02H 9/00* (2006.01)
(52) U.S. Cl. ........................................ 361/93.1; 361/58
(58) Field of Classification Search ............... 361/93.1, 361/91.1, 99, 94, 58
See application file for complete search history.

(56) References Cited
U.S. PATENT DOCUMENTS
4,536,699 A * 8/1985 Baker .......................... 323/276

| | | | | |
|---|---|---|---|---|
| 4,586,120 A * | 4/1986 | Malik et al. | ............. | 363/21.16 |
| 4,727,450 A * | 2/1988 | Fachinetti et al. | .......... | 361/103 |
| 4,972,136 A * | 11/1990 | Banura | ........................ | 323/275 |
| 5,039,953 A * | 8/1991 | Su | .............................. | 330/264 |
| 5,239,255 A * | 8/1993 | Schanin et al. | ............. | 323/237 |
| 5,572,395 A * | 11/1996 | Rasums et al. | ................ | 361/58 |
| 5,714,809 A * | 2/1998 | Clemo | ......................... | 307/125 |
| 6,288,883 B1 * | 9/2001 | Chen | ............................ | 361/58 |

OTHER PUBLICATIONS

P. Horowitz et al., The Art of Electronics, 1989, Cambridge University Press, 2nd Edition, pp. 102-104.*
A. Carlson et al., Electrical Engineering, 1981, Addison-Wesley Publishing Co., pp. 19-21, 52-55.*

* cited by examiner

*Primary Examiner*—Brian Sircus
*Assistant Examiner*—Zeev Kitov
(74) *Attorney, Agent, or Firm*—Bachman & LaPointe, P.C.

(57) ABSTRACT

A device for protecting a voltage source and a load supplied with power by the voltage source, comprises a switching element interposed between the voltage source and the load and is associated with a current limiting circuit including a measuring unit for measuring the current provided by the source and a control unit for controlling the switching element so as to prevent the current from exceeding a predetermined current threshold, and a voltage limiting circuit adapted to control the switching element so as to prevent the voltage supplied to the load from exceeding a predetermined voltage threshold.

7 Claims, 6 Drawing Sheets

PROTECTION DEVICE FOR PROTECTING A VOLTAGE SOURCE AND A LOAD SUPPLIED THEREBY

BACKGROUND OF THE INVENTION

1. Field of the Invention

The present invention relates to a device for protecting a voltage source and a load supplied with power by said source.

In particular, although not exclusively, it may be applied to power distribution systems in which it is difficult, or even impossible to control the bus and load impedance characteristics. More generally, it applies to all systems that use a direct current, such as in automobiles (42V), telecommunications (48 V), spacecraft, in particular, the international space station ISS.

2. Description of the Prior Art

Protection circuits have already been proposed, but generally such circuits perform a specific function. For instance, current limiting circuits or surge protection circuits, power limiting circuits, current peak suppressing circuits, and overvoltage protection circuits are known.

Surge protection circuits are generally comprised of a switching element such as a MOSFET (Metal Oxide Semiconductor Field-Effect Transistor) combined with a current measuring device. When the current intensity reaches a certain threshold value, the switching element is controlled so as to maintain the current intensity at or below this threshold value, thereby inducing a potential difference across the switching element and therefore, a reduction in the voltage and thus, in the current applied to the load. For that purpose, the switching element must be placed in a substantially linear mode of operation (as opposed to a saturated mode when it is used as a switch-only element). As a result, it has to dissipate power proportionately to the product of the current and the voltage applied thereto. However, the switching element's capacity to dissipate power is limited, and the switching element has to be quickly turned-off to avoid being damaged.

Thus, the current limiting capacity of current limiters is always associated with the maximum time during which they can operate in the linear mode, which is a short duration on the order of a few milliseconds.

In a complex power distribution system, the loads may be of any kind and the load controlling switch may be remote from both the source and the load (this is the case in the international space station). If the switch is used as a relay in the off or on state, such a control poses no stability problem. On the other hand, if the switch is used in a linear mode of operation for controlling the maximum current (as is the case of a current limiter), serious stability problems may occur. Generally, such stability problems are solved by limiting the bandwidth of the current loop, which increases the response time, or by inserting a known and controlled impedance upstream and downstream the current limiter, which requires capacitors and damping networks, thus increasing the required size of such a device.

Finally, such a surge protection circuit needs to be protected against overvoltages which may damage it because the circuit has been triggered in the off-state to protect the load (off-state circuit protection).

The most efficient surge protection circuits (adapted to loads with no overvoltage allowance) are those which short-circuit the voltage source by means of a thyristor, and thus transform the overvoltage into an overcurrent. Such circuits therefore require an overcurrent protection device which has the above-mentioned drawbacks.

Furthermore, this protection is well-suited to fault-induced overvoltages. On the other hand, in complex power distribution systems, these overvoltages may occur in a normal situation and therefore, may not result in the protection circuit being triggered.

Circuits for suppressing voltage peaks generally comprise an RC damping network or Zener diodes or also so-called "transorb" diodes that can absorb an amount of energy by an avalanche effect, and thus, restrict the voltage with a certain accuracy, on the order of +/−10% of their Zener voltage.

These circuits must in any case absorb the peak energy and reduce the voltage down to a safety level, but should also be compatible with overvoltages and transient phenomena liable to occur in the system to be protected. It has been found that in complex electrical power distribution systems, it is nearly impossible to ensure both of these functions through conventional means in a reliable manner.

Power limiting circuits are designed for measuring the voltage and current applied to a load, and control a power supply switching element (such as for current limiters) so as to maintain the product of voltage and current constant. Carrying out this regulation as a function of the product of voltage and current proves to be a complex operation.

Circuits for damping the quality factor (Q factor) have also been suggested. When the impedance of the circuit comprising the power supply bus and the load has a high Q factor, oscillations that occur upon transient overvoltages at the source or transient overcurrents at the load, may be observed. In order to suppress such oscillations, it is known to use a large damping capacitance which is unavoidably bulky and heavy. Such a capacitance is therefore not suited to spacecraft.

Generally, the prior art circuits may not withstand certain overvoltages smaller than those which trigger them upon shut-off. In addition, their operation depends on the source characteristics and the load impedance.

SUMMARY OF THE INVENTION

The invention is aimed at overcoming these drawbacks and, in particular, at providing a protection device which is adapted to any type of load, while having a compact size and limited losses, both on the load side and on the power supply side. This goal is achieved by providing a device for protecting a voltage source and a load supplied with power by said voltage source, comprising a switching element interposed between the voltage source and the load and combined with a current limiting circuit including a current measuring unit for measuring the current supplied by the source and a control unit for controlling the switching element so as to prevent the current from exceeding a predetermined current threshold.

According to the present invention, said device further comprises a voltage limiting circuit adapted to control the switching element so as to prevent the voltage supplied to the load from exceeding a predefined voltage threshold.

The inventive protection device may be inserted at any location between the source and the load, and acts transparently without influencing the rated load capabilities.

Advantageously, the voltage limiting circuit comprises means for detecting voltage changes at the device output which are fed-back to the current limiting circuit control unit so as to also provide functions of impedance stabilization, quality-factor damping and impedance matching between the voltage source and the load.

According to a preferred embodiment of the invention, the switching element comprises a MOSFET transistor which is mounted in series on the positive line of the power supply bus coupling the voltage source to the load, and has its gate supplied by the control member which acts upon the transistor as if it were a current source.

Preferably, the transistor is maintained in a linear mode of operation for preventing the current and voltage applied to the load from exceeding predetermined thresholds, the device further comprising a trigger circuit for turning the transistor off after a certain time of operation in the linear mode.

According to a preferred embodiment of the present invention, the control unit in the current limiting circuit comprises an amplifier for amplifying the current measurement supplied by the source and controlling the switching element, and the voltage limiting circuit is coupled to the amplifier for controlling the switching element in case of an overvoltage.

According to a further preferred embodiment of the present invention, the voltage limiting circuit comprises a Zener diode mounted so as to clamp the voltage applied to the load to a predetermined value at the onset of an overvoltage, wherein the voltage limiting circuit controls the switching element so as to take over on the Zener diode and limit the voltage at the end of the overvoltage.

According to another preferred embodiment of the present invention, the voltage limiting circuit comprises a Zener diode mounted so as to absorb most of the overvoltages applied by the source, whereas the switching element is controlled by the voltage limiting circuit so as to be placed in its linear mode of operation.

According to still another preferred embodiment of the present invention, the transistor is chosen in order to have sufficient gate-source and gate-drain stray capacitances for the transistor to be controlled, in case of an energy surge, so as to be placed in its linear mode of operation by means of the current injected in the stray capacitances.

According to yet another preferred embodiment of the present invention, the device further comprises a power limiting circuit adapted to control the switching element so as to prevent the power supplied by the source from exceeding a predefined power threshold during a time period exceeding a given value.

BRIEF DECRIPTION OF THE DRAWINGS

A preferred embodiment of the invention will be described below by way of non-limiting example with references to the accompanying drawings, in which.

DESCRIPTION OF THE PREFERRED EMBODIMENTS

Figure 1:
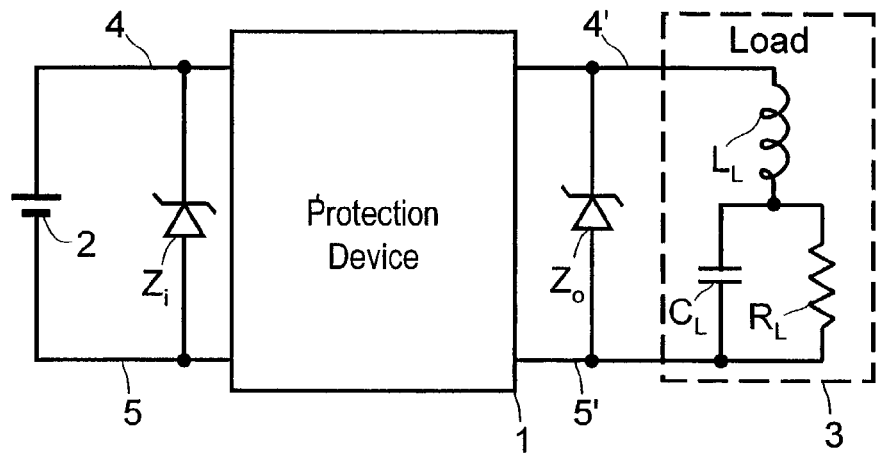
FIG. 1 shows a power supply circuit incorporating a protection device according to the present invention.

FIG. 1 shows a protection device designed according to the present invention based on a single switching element, and intended to be interposed on a DC power supply bus which couples the voltage source 2 to a load 3. The load 3 may be modeled as an inductor $L_L$ which is mounted in series with a resistor $R_L$ in parallel with a capacitor $C_L$. The power supply bus comprises a bus section 4, 5 which couples the voltage source 2 to device 1 and a section 4', 5', which couples device 1 to load 3, each section being comprised of a positive supply line 4, 4' and a negative supply line 5, 5'.

The power supply bus may naturally have a resistive and inductive series impedance and a small capacitance.

There may be provided an input Zener diode $Z_i$ between voltage source 2 and protection device 1, and an output Zener diode $Z_o$ between the protection device and load 3. The voltage-transient suppressing diode $Z_i$ enables, by dissipating the power stored within the circuit, the line inductance to be set to the maximum voltage allowed by the switching element in protection device 1. On the other hand, this diode enables due to its small impedance the current of the energy surges to be converted into voltage, so that the protection device 1 can regulate the voltage applied to load 3.

Zener diode $Z_o$ allows the voltage to be set, if required, to a value allowed by the load until the switching element in the protection device responds to limit the voltage. Said Zener diode may be replaced by a freewheeling diode.

Figure 2:
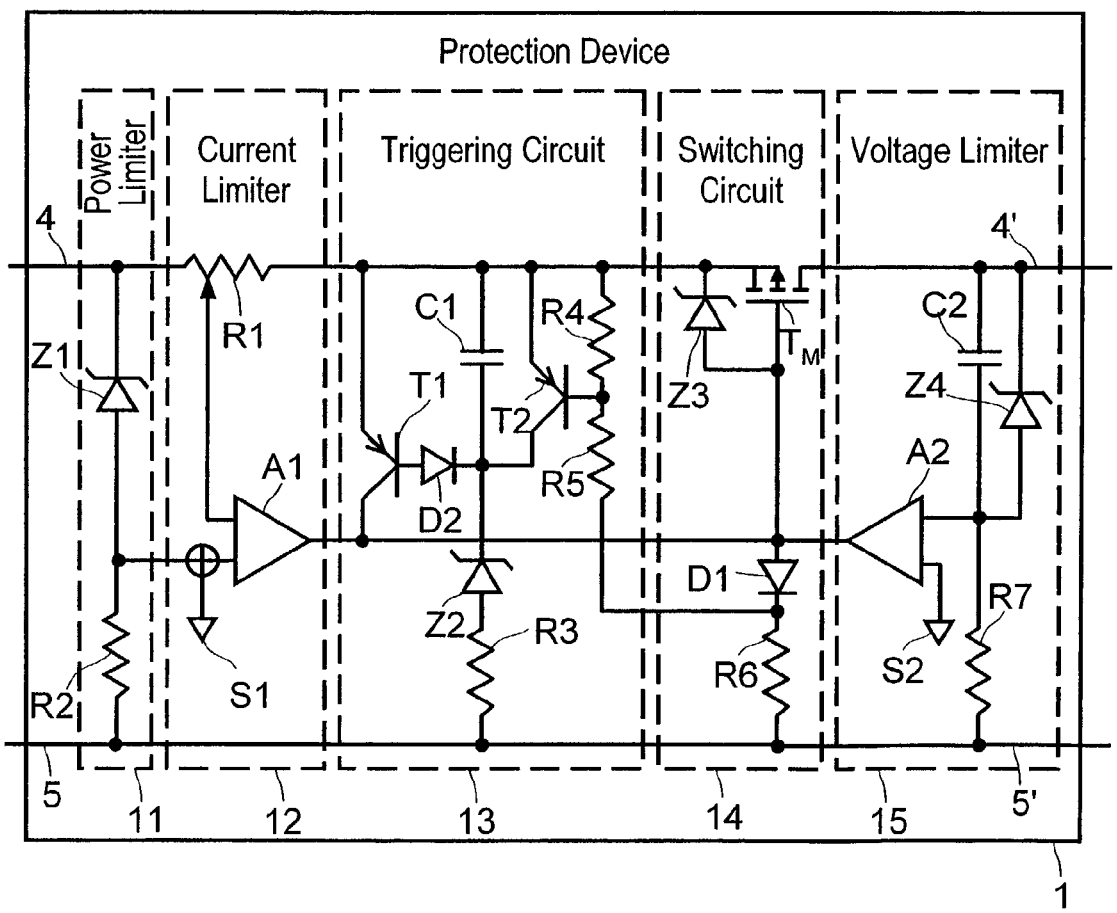
FIG. 2 shows a more detailed view of the protection device shown in FIG. 1.

In FIG. 2, protection device 1 comprises, successively, in the order from the voltage source:
  a power limiting circuit 11,
  a current limiting or surge protection circuit 12,
  a cut-off triggering circuit 13,
  a switching circuit 14, and
  a voltage limiting or overvoltage protection circuit 15 also providing an impedance stabilization function.

According to the present invention, the switching function of protection circuits 11, 12 and 15 is provided by the switching circuit 14 alone, in association with the triggering circuit 13.

Switching circuit 14 is designed around a P-channel MOSFET transistor, $T_M$, having its drain and source arranged in series on the positive supply line 4, 4', and its gate supplied through a Zener diode Z3, with its reverse terminal coupled to supply line 4. In addition, a gate of transistor $T_M$ is coupled to the supply line 5' through a forward-mounted diode D1, in series with a resistor R4. The resistance of resistor R4 is chosen to be sufficiently high for the transistor $T_M$ to be placed in its saturated mode as soon as a sufficient voltage is applied across lines 4 and 5. A high value of resistance R4 also allows the power consumption of the device to be limited.

The power limiting circuit 11 comprises a Zener diode Z1 in series with a resistor R2, which are mounted together in parallel between lines 4 and 5. This circuit is arranged at the input of the device in order to control the input power, this power monitoring alone being required in a limited power distribution system. In fact, this circuit allows the power hyperbolic law to be approximated, as a function of voltage and current, by line segments and one curve portion defined by Zener diode Z1.

If the input power is too high and applied for too long, the circuit triggers a cut-off by means of the switching circuit 13, in the same manner as the current limiting circuit or surge protection circuit 12.

The current limiting or surge protection circuit 12 is designed around the switching circuit 13 and comprises a current measuring device to control the latter. Circuit 12 relies upon the voltage characteristics of Zener diode Z3 associated with transistor $T_M$, so that the current limiting function can be combined simply with other protection functions (voltage limitation and impedance stabilization).

This circuit comprises an amplifier A1 provided at its first input with a voltage supplied by a voltage source S1, to which is added the voltage at the junction point between Zener diode Z1 and resistor R2. The second input to amplifier A1 is provided with a current measurement value of the current flowing through a resistor R1 mounted in series on line 4, 4'. Amplifier A1 acts to amplify the current measurement across resistor R1 and to control the switch 14 in order to place transistor $T_M$ in a linear mode of operation beyond a given threshold so as to maintain the current in resistor R1 below said threshold.

When the current flowing within resistor R1 increases, the voltage across Zener diode Z3 decreases up to a point where this voltage becomes insufficient for diode Z3 to be conducting. Transistor $T_M$ then switches to its linear mode of operation, which reduces the current through resistor R1.

The current limit depends on the resistance of resistor R1 which advantageously is adjustable.

In relation to prior art solutions, this circuit has a lesser accuracy as far as the exact value of the current limitation is concerned, but is substantially simpler and faster.

In the above-described circuit, all of the control electronics are placed either on the return line (voltage control), or on the line from the voltage source (current control), and acts on the switching element (transistor $T_M$) as a current source. These provisions allow the common-mode transients that might be generated by the source to be avoided.

Circuit 15 both provides an overvoltage protection and peak suppression function, an impedance stabilization function and a Q-factor damping and impedance matching function between the voltage source and the load.

The two latter functions, in particular, are provided by a capacitor C2 and a resistor R7, connected in series between lines 4 and 5, the junction point between capacitor C2 and resistor R7 being connected to the input of an amplifier A2 having its other input connected to a voltage source S2 and its output connected to the gate of transistor $T_M$. This circuit responds to the positive-going voltage changes between lines 4, 4' and 5, 5' to damp oscillations, which tend to occur downstream transistor $T_M$ over line 4'. If a negative-going voltage change occurs, it is seen as an overload, which is handled by the current limiting circuit 12. Besides, the oscillations are eliminated since transistor $T_M$ goes into its linear mode of operation as soon as they appear, which causes the Q-factor to be damped.

The voltage limiting and peak suppression function is mainly ensured by Zener diode Z4, which is mounted in parallel with capacitor C2. This Zener diode operates in conjunction with transistor $T_M$ in order to block the transient overvoltages and to restrict the voltage applied to the load. The limiting voltage is determined by the voltage characteristics of Zener diode Z4. In case of a power peak, Zener diode Z4 is conducting. As a result, the output of amplifier A2 places transistor $T_M$ in its linear mode of operation, whereas Zener diode Z4 absorbs a major portion of the power during the overvoltage. In this manner, transistor $T_M$ only undergoes the power peak during a very short time period, which is much smaller than 10 µs.

Peak suppression is carried out by combining the circuit that performs the voltage limiting function and Zener diode $Z_i$, also known as a "transorb" diode, and comprises a pn junction having a small impedance in case of avalanche breakdown. The transorb diode absorbs the power in the peak by converting the peak current into a voltage (but does not clamp the voltage to a level acceptable for the load). The voltage clamped by the diode is selected as a function of the power to be dissipated (and not as a function of the maximum voltage applicable to the load, as in the prior art). The protection device 1 therefore adjusts the power supply bus voltage to a value acceptable for those components of device 1 which are located downstream on bus 4', 5', during surge suppression. In the worst case, protection device 1 only needs to absorb the voltage clamped by the transorb diode.

The combination of transorb diode $Z_i$ and voltage limiting circuit 15 thus allows the problem of power surge absorption, and separately, the problem of regulating the voltage applied to the load to be solved. In practice, the transorb diode $Z_i$ comprises several series-mounted transorb diodes so as to avoid sensitiveness to single-component failure.

The cut-off trigger circuit 13 allows to make sure that if transistor $T_M$ is placed in its linear mode of operation after an overvoltage or overcurrent, this situation does not last more than a few milliseconds so as to avoid any possible damage to transistor $T_M$, which dissipates the excess power by heating-up. Therefore, this circuit acts to turn transistor $T_M$ off after a few milliseconds of operation in its linear mode. In the example shown in FIG. 2, this circuit comprises a pnp transistor T1 arranged between line 4 and the output of current limiting circuit 12, the base of this transistor being connected to the forward terminal of a diode D2. The other terminal of diode D2 is connected, on the one hand, to line 4 through a capacitor C1 arranged in parallel between the collector and the emitter of another pnp transistor T2, and on the other hand, to line 5 through a reverse-mounted Zener diode Z2, in series with a resistor R3. The base of transistor T2 is coupled through a resistor R4 to line 4, and through a resistor R5 to the junction between diode D1 and resistor R6 of a switching circuit 14.

Capacitor C1 is charged through the Zener diode Z2 and resistor R3. In normal operation, that is in the absence of any overvoltage or overcurrent, capacitor C1 is short-circuited by transistor T2 being controlled through a divider bridge comprised of resistors R4 and R5, by Zener diode R3, which biases the base-emitter junction to more than 1 volt, thus ensuring its saturation. When transistor $T_M$ is placed in its linear mode of operation because of an overcurrent, transistor T2 switches to the linear mode and capacitor C1 charges (to more than 1 V). Transistor T1 then changes state and acts as a latching flip-flop by assuming the state of the output of the surge protection circuit 12 or overvoltage protection circuit 15, which causes capacitor C1 to discharge. The time constant of the discharge circuit is defined by the product of the capacitor's capacitance C1 and resistance R3. When the input voltage (over line 4) increases, the time constant should be reduced in proportion so as to maintain the power dissipation in transistor $T_M$ constant. Thus, circuit 13 allows the power dissipated by transistor $T_M$ to be controlled.

Figure 3:
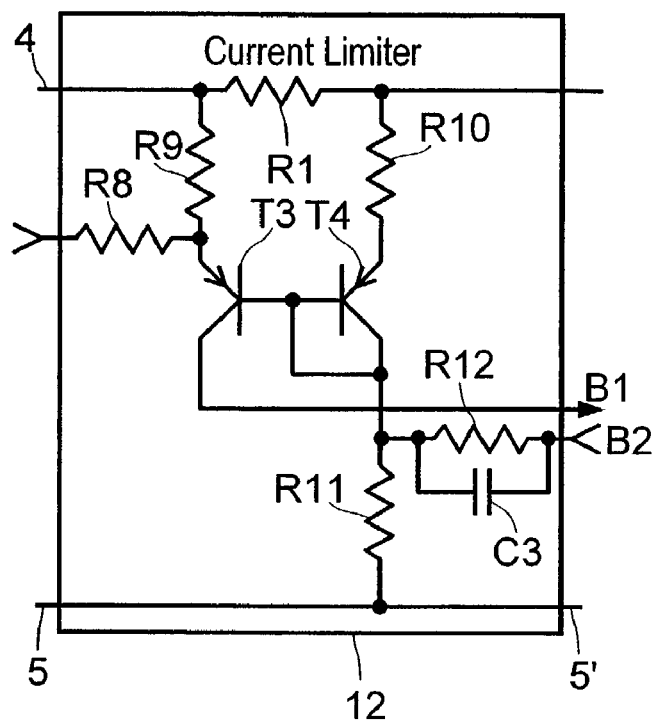
FIGS. 3 and 4 show a detailed view of exemplary implementations of two portions of the device shown in FIG. 2.

FIG. 3 shows an implementation example of current limiting circuit 12. In this figure, circuit 12 comprises two pnp transistors, T3, T4, arranged as a dual transistor (the bases of both transistors being connected to one another), having their collectors connected to the two terminals of resistor R1, respectively, through two respective resistors R9, R10. The collector of transistor T3 is further coupled to the input of circuit 12 through a resistor R8, this input being connected to the junction point between Zener diode Z1 and resistor R2. The emitter of transistor T3 is connected to the output B1 of circuit 12. The emitter of transistor T4 is connected to its base, and coupled to line 5 through a resistor R11 for biasing both transistors. The emitter of transistor T4 is also coupled to an input B2 of circuit 12 through a resistor R12 mounted in parallel with a decoupling capacitor C3. Output B1 is intended to be connected to the gate of transistor $T_M$, whereas output B2 is to be connected to an input of overvoltage protection circuit 15.

As a result, resistor R6, which is grounded and coupled to the gate of transistor $T_M$ behaves as a biasing resistor for transistor $T_M$.

When the current increases within the current measuring resistor R1, the base-emitter voltage of transistor T4 increases. The current flowing through resistor R10 therefore increases, which decreases by the same amount the current flowing through Zener diode Z3 and therefore, its voltage. When the voltage across the Zener diode becomes smaller than the Zener voltage, transistor $T_M$ goes into its linear mode of operation, thereby limiting the current in resistor R1.

If higher accuracy is desired, it is preferable to use a dual transistor (implemented as a single component) for transistors T3 and T4, rather than having two separate transistors.

Figure 4:
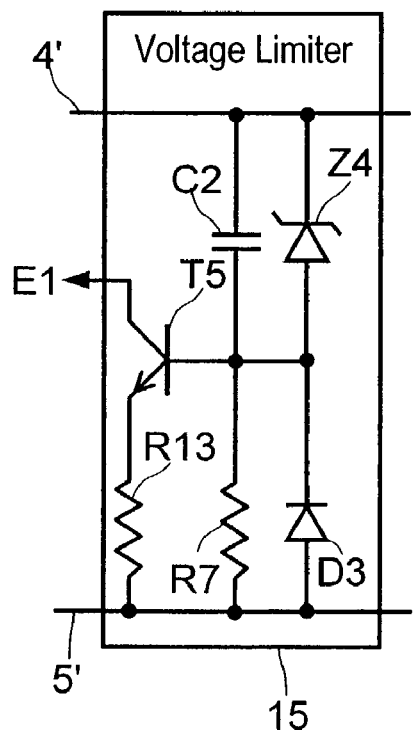

FIG. 4 shows an implementation example of an overvoltage protection circuit 15, and in particular, the impedance stabilization and Q-factor damping functions of said circuit. These functions are simplified in that they rely upon detecting positive-going voltage changes (which are the most dangerous ones).

This circuit comprises an npn transistor T5 having its collector connected to an output E1 of circuit 15 (connected to input B2 of circuit 12), and its emitter coupled to biasing resistor R13. The base of said transistor, on the one hand, is connected to the junction point between capacitor C2 and Zener diode Z4, and on the other hand, is coupled to line 5 through a resistor R7 and a reverse-mounted diode D3.

This circuit acts as a large capacitance connected between lines 4 and 5, the voltage changes generating a current which is amplified by the circuit comprised of transistors T5, T3, T4 and series resistors.

Actually, transistor T5 is mounted as a voltage follower for amplifying the current by a factor equal to the ratio of resistances R7 to R13. The current through the base of transistor T5 is reflected in its collector, which generates an additional base current within transistor T4. Due to a mirror effect, this base current flows through transistor T3 and is amplified by an amplification factor equal to the ratio of the resistances of resistors R9 and R10, so that the amplified current controls the gate of transistor $T_M$.

It should be noted that resistances R6 and R10 should be matched with the voltage across lines 4 and 5, so as to optimize their residual consumption.

In the device shown in FIG. 2, wherein circuits 12 and 15 are those shown in FIGS. 3 and 4, the functions of amplifiers A1 and A2 are partially integrated in that the control function of transistor $T_M$ is unique (output B1), since circuit 15 shown in FIG. 4 only performs an amplification of the voltage measurement, which measurement is supplied to input B2 of circuit 12 shown in FIG. 3. Actually, the amplified voltage measurement at output E1 acts as a biasing voltage for the current amplifier and therefore influences the way switch 14 is controlled.

In addition, if Zener diode $Z_o$ is replaced by a diode arranged in the same direction, the overvoltages and power surge protection function is carried out in a slightly different way. Indeed, in this case, Zener diode Z4 simply clamps the voltage level of a first portion of the overvoltage, and triggers transistor $T_M$, which, after the voltage loop response time, regulates the voltage at a smaller value than the Zener voltage of diode Z4. Thus, the Zener diode clamps the voltage during a few microseconds, and then allows the transistor $T_M$ to take over for limiting the voltage.

Thanks to these provisions, the protection device described so far by way of example performs a large number of protective functions with a reduced number of discrete electronic components (31 components) in a substantial manner relative to prior art devices.

It may be noted that the inventive device has, in addition to a power limiting function performed by circuit 11, a squared power limiting characteristic, since it has separate functions of current limitation and voltage limitation and therefore has independently defined voltage and current limits. In order to implement the hyperbolic power-limiting characteristic, the current limit only needs to be reduced when the voltage exceeds its rated value.

The law obeyed by the change in the current limit as a function of the input voltage is defined by two line segments having characteristics depending on diode Z1, resistor R2 and the resistance between the junction point of Z1 and R2 and the gate of transistor $T_M$, that is, resistor R8 in the example shown in FIG. 3.

Also, it may be noted that the inventive device may be triggered following power surges, thus allowing it to be protected in the same way as the load, even if the input transorb diode $Z_i$ fails in the off state. If a fault occurs on the load side, the device continues to isolate the load even after a power surge.

The chosen transistor $T_M$ preferably has significant gate-source and gate-drain capacitances. Thus, in case of power surge on the power supply bus 4-5, transistor $T_M$ is controlled by the voltage change thanks to the current injected into said stray capacitances. The switch does not need to continue being controlled at a low impedance in order to maintain the latter in the off-state after the voltage peak. On the contrary, this control is purposely designed in order to allow the circuit to be turned on again immediately after the transient, while avoiding destruction of the switch. The transorb diode $Z_i$ is provided in order to restrict the transient voltages applied to the load.

If the switch is in the off state before the transient, this means that the load is faulty since the switch is always in the on state in the absence of fault when the bus voltage is present. In this case, as long as the protection is effective on the supply bus side, the power surge may be injected without any damage risk. In any case, an immediate restart after a power surge will damp out the oscillations that may result from this surge.

The device described so far is insensitive to any component failure, since lines 4 and 5 are never short-circuited in case a component fails.

The curves shown in FIGS. 5 to 8 illustrate the performance of the inventive device 1, when connected to various kinds of load 3, in response to an inductive overvoltage of about 200 mJ. Advantageously, this energy is absorbed by the transorb diode $Z_i$ at 240 V.

These curves were obtained with a device designed for operation with a rated voltage supply of 120 V for load powers of less than 200 W, with an input current limit of 1.5 A, for a voltage ranging from 90 to 165 V, and for eliminating a maximum inductive energy of 500 mJ, with a voltage limit on the load side of 170 V, and a trigger time of 1 to 2 ms in case of overvoltage or overcurrent.

In order to obtain such performance, the components in device 1 may have, for example, the following parameters:

| Z3: Zener voltage of 11 V | R2: 100 kΩ | R6: 60 kΩ | R10: 225 kΩ |
|---|---|---|---|
| C1: 1 μF | R3: 400 kΩ | R7: 500 kΩ | R11: 120 kΩ |
| C2: 0.1 nF | R4: 30 kΩ | R8: 15 kΩ | R12: 30 kΩ |
| C3: 100 pF | R5: 250 kΩ | R9: 105 kΩ | R13: 100 kΩ |

Figure 5A:
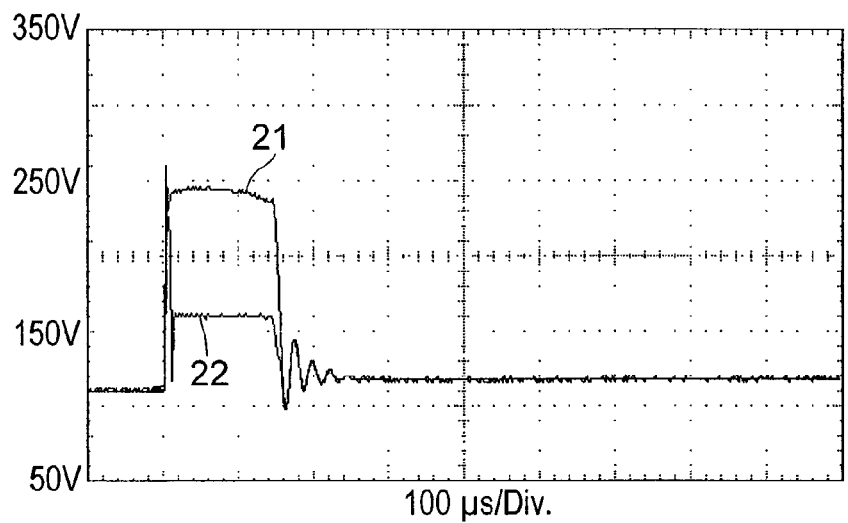
FIGS. 5 to 8 show, in the form of curves the operation of the protection device of the present invention.
Figure 5B:
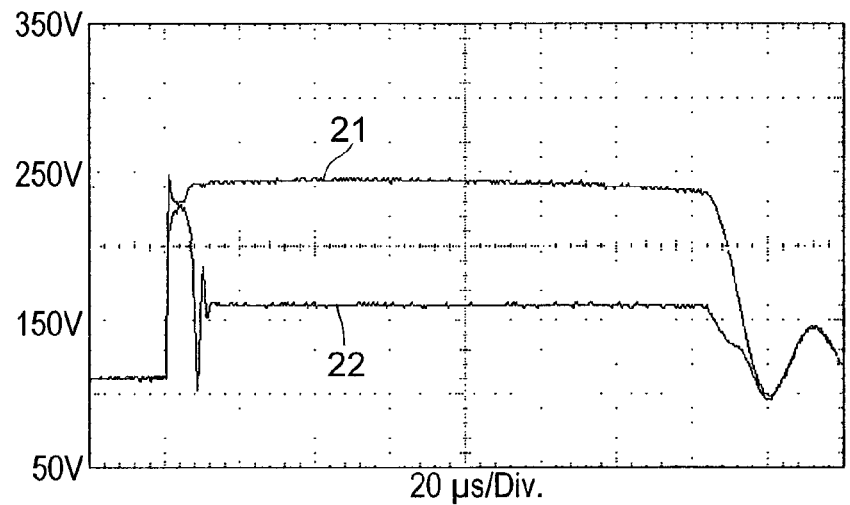
Figure 5C:
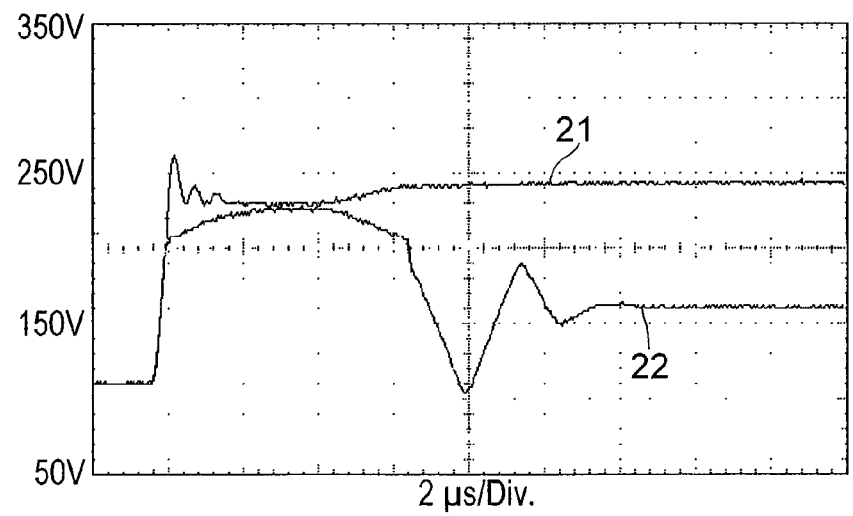

The curves shown in FIGS. 5a to 5c show, with different time scales, the voltage variations as a function of time at the input (curve 21) and the output (curve 22) of device 1 with a resistive and inductive load ($R_L=108Ω$, $L_L=5$ μH et $C_L=0$). These curves show that device 1 responds in about 8 μs to limit the overvoltage of 240 V to about 170 V for the whole duration of the overvoltage.

Figure 6A:
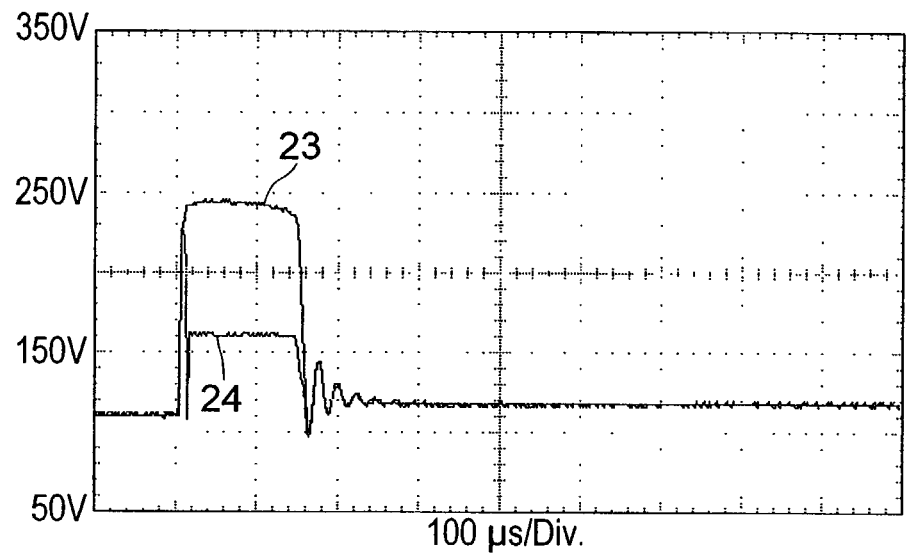
Figure 6B:
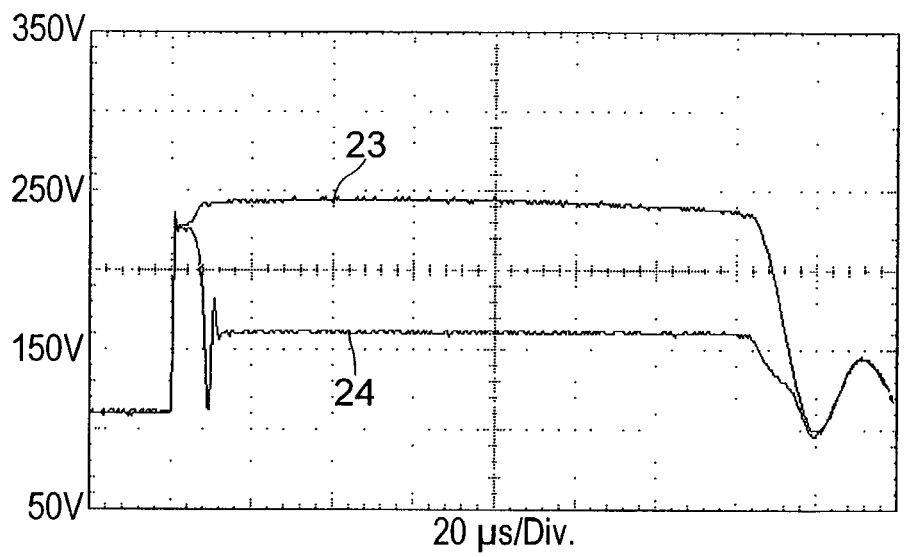

The curves shown in FIGS. 6a to 6b show, with different time scales, the voltage variations as a function of time at the input (curve 23) and output (curve 24) of device 1 with a purely resistive load ($R_L=108$ Ω, $L_L=0$ et $C_L=0$). These curves show that the inventive device on the one hand prevents the output voltage from exceeding 170 V and on the other hand, responds in about 10Ωs to limit the overvoltage to this value. In particular, FIG. 6b shows that the voltage is clamped at a lower level by diode $Z_o$ during the first 10 μs, and then the input voltage is clamped by diode $Z_i$ which suppresses the energy stored within the line, whereas the output voltage is regulated by transistor $T_M$ placed in its linear mode, diode $Z_o$ being blocked.

Figure 7A:
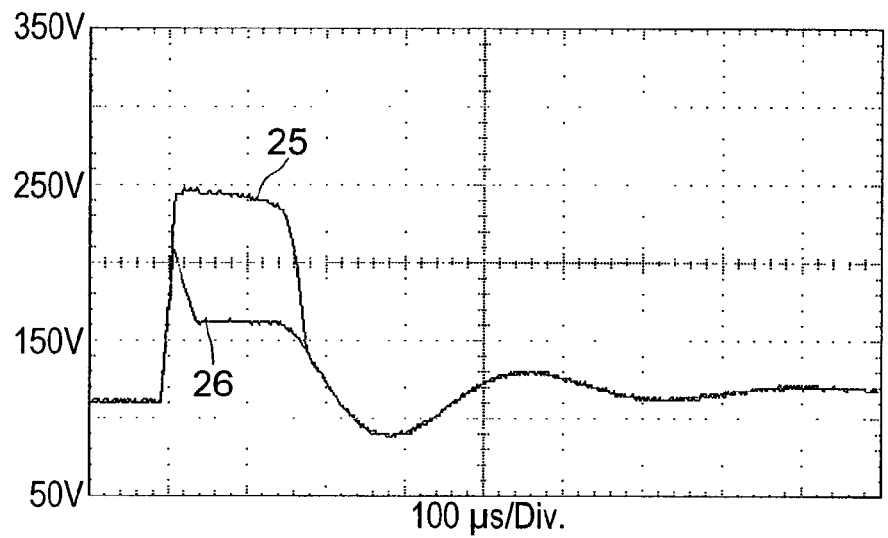
Figure 7B:
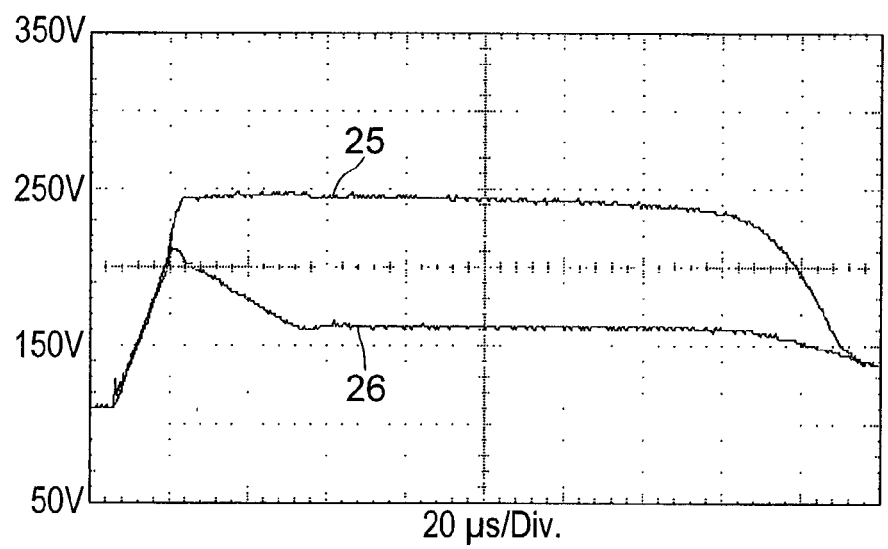

As is apparent from FIGS. 7a and 7b, device 1 prevents the voltage applied to a resistive and capacitive load 3 ($R_L=108$ □, $L_L=0$ et $C_L=1$ μF) from exceeding the output Zener diode voltage, or about 180 V (curve 26). Then, this voltage is reduced to 170 V nearly 40 μs after the onset of the overvoltage applied as input (curve 25).

Figure 8A:
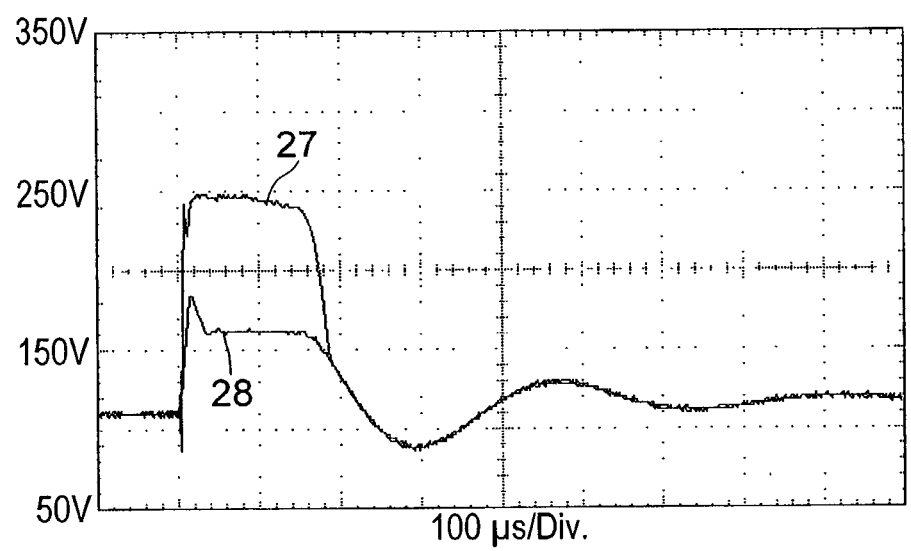
Figure 8B:
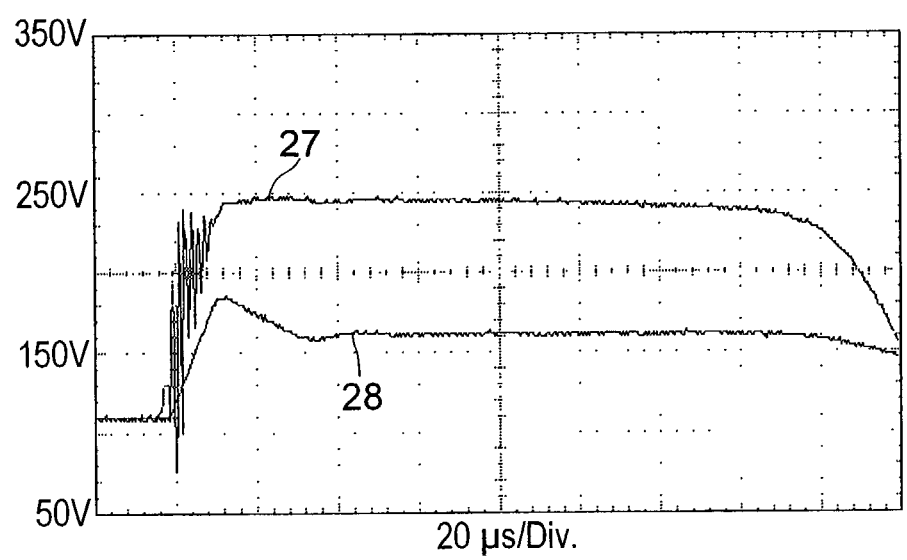

FIGS. 8a and 8b show the voltage variations at the input (curve 27) and the output (curve 28) of device 1 with a resistive, inductive and capacitive load ($R_L=180$ □, $L_L=5$ μH and $C_L=1$ μF).

What is claimed:

1. A protection device for protecting a voltage source and a load supplied with power by said voltage source, comprising:
   a switching circuit interposed on a power supply bus between said voltage source and said load and associated with a current limiting circuit, said current limiting circuit comprising a unit for measuring the current supplied by said source and a control unit for controlling the switching circuit so as to prevent the current from exceeding a predefined current threshold, said switching circuit comprising a MOSFET transistor mounted in series on a positive feeding line of the power supply bus coupling said voltage source to said load, said MOSFET transistor having a gate which is supplied with power by said control unit, which acts as a current source on a biasing impedance connected to the MOSFET gate,
   a voltage limiting circuit adapted to control said switching circuit so as to prevent the voltage supplied to said load from exceeding a predefined voltage threshold, said MOSFET transistor being maintained in a linear operating mode for preventing current and voltage applied to said load from exceeding said predefined current and voltages thresholds, and
   a trigger circuit for turning the MOSFET transistor off after a given operating time in its linear operating mode.

2. The protection device according to claim 1, wherein said voltage limiting circuit comprises means for detecting voltage variations at an output of the protection device, which are fed-back to said control unit of said current limiting circuit, so as to ensure functions of impedance stabilization, quality-factor damping, and impedance matching between said voltage source and said load.

3. The protection device according to claim 1, wherein said control unit in said current limiting circuit comprises an amplifier for amplifying the current measurement of the current supplied by said source and controlling said switching circuit, the voltage limiting circuit being coupled to the amplifier for controlling said switching circuit in case of overvoltage.

4. The protection device according to claim 1, wherein said voltage limiting circuit comprises a Zener diode mounted so as to clamp voltage applied to the load to a predetermined value at onset of an overvoltage, said voltage limiting circuit controlling said switching circuit so that it takes over on the Zener diode and limits said voltage at the end of the overvoltage.

5. The protection device according to claim 1, wherein said voltage limiting circuit comprises a Zener diode arranged so as to absorb a major portion of overvoltages applied by said source, while said switching circuit is controlled by said voltage limiting circuit so as to be placed in its linear mode of operation.

6. The protection device according to claim 1, wherein said transistor is chosen so as to have sufficient gate-source and gate-drain stray capacitances for the transistor, in case of an energy surge, to be controlled in order to be placed in OFF state by means of current injected into stray capacitances.

7. The protection device according to claim 1, further comprising a power limiting circuit adapted to control said switching circuit so as to prevent the power from exceeding a predefined power threshold during a time period.

* * * * *